US010006513B1

(12) United States Patent
Wang

(10) Patent No.: US 10,006,513 B1
(45) Date of Patent: Jun. 26, 2018

(54) PARTICLES EMPLOYED IN PARTICLE IMPACT DAMPERS

(71) Applicant: NORTHROP GRUMMAN SYSTEMS CORPORATION, Falls Church, VA (US)

(72) Inventor: Ge Wang, Los Alamitos, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 0 days. days.

(21) Appl. No.: 15/414,487

(22) Filed: Jan. 24, 2017

(51) Int. Cl.
*F16F 7/01* (2006.01)

(52) U.S. Cl.
CPC ..................... *F16F 7/015* (2013.01)

(58) Field of Classification Search
CPC ..................... F16F 7/01; F16F 7/015
USPC .......................... 188/378, 379, 380
See application file for complete search history.

(56) References Cited

U.S. PATENT DOCUMENTS

| | | | | |
|---|---|---|---|---|
| 1,461,787 A * | 7/1923 | Stebbins | ................ | B61G 9/10 213/22 |
| 5,365,842 A * | 11/1994 | Panossian | ............ | B41F 13/085 101/216 |
| 6,543,590 B1 * | 4/2003 | Monson | ................... | F16F 7/01 188/268 |
| 6,547,049 B1 * | 4/2003 | Tomlinson | ............. | F01D 25/04 188/379 |
| 6,598,718 B2 * | 7/2003 | Kato | ........................ | F16F 7/10 188/378 |
| 6,719,108 B2 * | 4/2004 | Hasegawa | ............. | B60G 7/001 188/268 |
| 6,955,250 B2 * | 10/2005 | Kreider | .................... | F16F 7/01 188/268 |
| 9,512,894 B2 * | 12/2016 | Boechler | ................ | F16F 7/015 |
| 2007/0221460 A1 * | 9/2007 | Guo | ........................ | F16F 7/10 188/378 |

OTHER PUBLICATIONS

Witt, Brian Lee, "Particle Impact Damping in the Horizontal Plane" A Thesis, USA May 2011, 81 pgs.

Lu, Zheng et al. "Studies of the Performance of Particle Dampers Attached to a Two-Degree-of-Freedom System Under Random Excitation" Journal of Vibration and Control, 2010, pp. 1454-1471.

Du, Yanchen et al. "Energy Dissipation in Normal Elastoplastic Impact Between Two Spheres" Journal of Applied Mechanics, vol. 76, Nov. 2009, pp. 031010-1-061010-8.

(Continued)

*Primary Examiner* — Thomas J Williams
(74) *Attorney, Agent, or Firm* — John A. Miller; Shumaker, Loop & Kendrick, LLP

(57) ABSTRACT

A particle impact damper including an outer body defining an internal cavity and a plurality of spherical particles positioned within the cavity. The spherical particles each include an inner core made of a high density and a high modulus material, such as tungsten, and a thin outer coating made of a high coefficient of friction and low yield strength material, such as aluminum. The cavity has a high coefficient of friction inner surface. The spherical particles can be provided in two sets of particles including a first set having a larger diameter and a second set having a smaller diameter so as to increase the fill ratio of the particles in the cavity.

20 Claims, 2 Drawing Sheets

(56) References Cited

OTHER PUBLICATIONS

Mao, Kuanmin et al. "Simulation and Characterization of Particle Damping in Transient Vibrations" Transactions of the ASME, vol. 126, Apr. 2004, pp. 202-211.
Wu, C. J. et al. "Modeling of Granular Particle Damping Using Multiphase Flow Theory of Gas-Particle" Transactions of the ASME, vol. 126, Apr. 2004, pp. 196-201.
Xu, Zhiwei et al. "An Experimental Study of Particle Damping for Beams and Plates" Journal of Vibration and Acoustics, vol. 126, Jan. 2004, pp. 141-148.
Xu, Zhiewi et al. "Particle Dam,ping for Passive Vibration Suppression: Numerical Modeling with Experimental Verification" Proceedings of DETC'03 ASME 2003 Design and Engineering Technical Conferences and Computers and Information in Engineering Conference, USA Sep. 2-6, 2003, pp. 1-9.
Fowler, Bryce L. et al. "Design Methodology for Particle Damping" Smart Structures and Materials, 2001, Damping and Isolation, Proceedings of SPIE vol. 4331, 2001, pp. 186-197.
Tianning, Chen et al. "Dissipation Mechanisms of Non-Obstructive Particle Damping Using Discrete Element Method" Smart Structures and Materials, 2001, Damping and Isolation, Proceedings of SPIE vol. 4331, 2001, pp. 294-301.
Salvino, Liming W. et al. "Evaluation of Granular-Fill Damping in a Shock-Loaded Box Beam" Proceedings of the 69th Shock and Vibration Symposium, USA, Oct. 12-16, 1998, pp. 1-10.

\* cited by examiner

PARTICLES EMPLOYED IN PARTICLE IMPACT DAMPERS

BACKGROUND

Field

This invention relates generally to a particle impact damper and, more particularly, to a particle impact damper that includes a hollow body having an inner surface made of a high strength, corrosion resistant alloy that is filled with spherical particles each having a high density and high modulus alloy core and a high coefficient of friction with low yield strength outer coating, where the particles have different diameters to provide a high fill ratio of the body.

Discussion

Cyclic fatigue of materials often results in a major failure mode of components used in various machines, such as automobiles, aircraft and spacecraft. The cause of cyclic fatigue in these components is typically a result of vibratory loads experienced during operation of the machine. For example, the launch of a rocket to deploy a spacecraft imposes a tremendous magnitude of shock and vibrational loads on the rocket and spacecraft structures as well as other sensitive devices installed in the spacecraft platform, such as a cryogenic cooling system.

In order to endure significant vibratory loads, it is possible to make component or structure larger and heavier. However, such a remedy has many obvious drawbacks, such as increased cost, larger launch vehicles for spacecraft, etc. It is known in the art to provide structures that can tolerate greater vibrational loads by employing active and/or passive damping mechanisms to minimize the vibrations. Active damping or vibration control requires significant sensing circuits, actuators and control logic, and thus is inherently less reliable than simple passive damping. Passive damping techniques often employ viscoelatic materials, such as rubbery polymeric materials, to provide the passive damping. However, the effectiveness of such materials is often temperature sensitive and cannot be employed for overly cold or hot temperature conditions. For example, polymeric materials typically cannot be employed near the hot exhaust of a rocket engine because the material changes its properties under high heat, which reduces its ability to provide damping. Further, employing a polymeric material as a damper for sensitive cryo-genic cooling devices, such as cryo-genic cooling of sensitive spacecraft sensors, may subject the polymeric material to the low temperatures of the cryo-genic cooling, which reduces the ability of the material to provide the desired damping. In addition, polymeric materials degrade over time and lose their damping functionality.

Particle impact dampers are known in the art that employ particles made of a particulate material enclosed inside a cavity that could be part of an existing structure or incorporated onto sensitive devices. The particles are often a metallic powder and the damping functionality is neither temperature dependent nor changes over time. Furthermore, the damping effect of the particles is generally broadband in that it is effective across a broad range of frequency spectrums and is highly nonlinear. However, the exact damping mechanism of a particle impact damper is not well understood and the specific choices and material selections for the particles are not adequately discussed in the literature.

DETAILED DESCRIPTION OF THE EMBODIMENTS

The following discussion of the embodiments of the invention directed to a particle impact damper is merely exemplary in nature, and is in no way intended to limit the invention or its applications or uses. For example, the discussion below of the particle impact damper is described as having particular application for a rocket structure. However, as will be appreciated by those skilled in the art, the impact damper of the present invention will have application for other structures, such as automobiles and aircraft.

The present invention proposes a particle impact damper including an array of spherical particles each being made of specialized materials. A number of factors have been considered when designing the specific particles for the particle impact damper including the mass ratio between the mass of the damper and the mass of the structure being damped, the coefficient of friction of the particles and cavity walls, modulus and yield strength of the particles, and packing of the particles. A high modulus, high density and low yield strength of the particles is desirable, for example, particles of lead, tungsten or tungsten carbide are often preferred in the damper construction. A high coefficient of friction between the particles and the cavity wall facilitates dissipation of kinetic energy carried by the moving particles in a dynamic environment. In other words, by providing a high coefficient of friction between the particles and the cavity wall, the kinetic energy caused by the vibration of the structure is converted by the friction between the particles and between the particles and the cavity wall to heat where it can be dissipated. However, heavy metals, such as tungsten, do not typically posses a high coefficient of friction. The mass ratio between the particle damper and the structure that requires damping is a critical parameter for the effectiveness of the damper, where the higher the mass ratio the more effective the damping. To increase the mass ratio between the particle damper and the structure, the packing ratio of the particles needs to be maximized, for example, near 100%. Spheres with a single diameter will not result in a high packing ratio, but the careful selection of spheres with two different diameters increases the packing ratio. To this end, in one embodiment, the particles are spherical and include an inner core made of a high density and high modulus material, and a thin metal coating having a high coefficient of friction and low yield strength.

Figure 1:
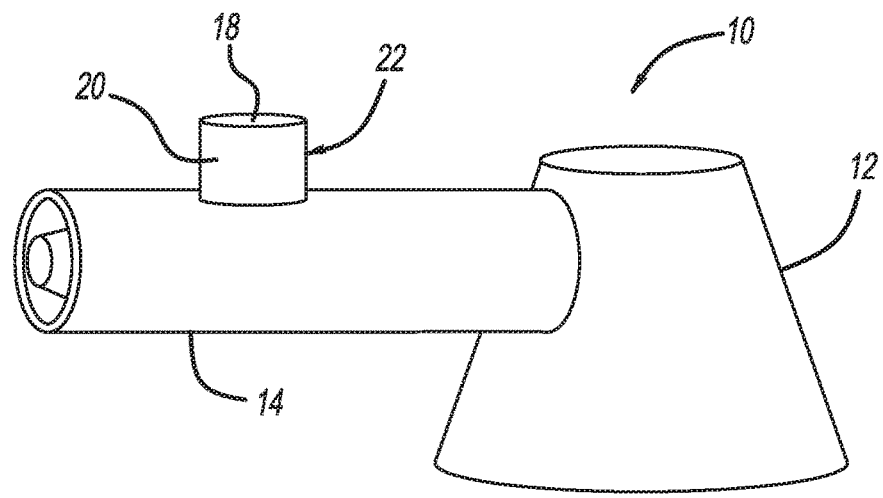
FIG. 1 is an isometric view of a rocket structure including a particle impact damper.

FIG. 1 is a simple isometric view of a rocket structure 10 including a rocket engine nozzle 12 and an actuator arm 14 coupled thereto. A particle impact damper 22 is mounted to the actuator arm 14 in a manner so that the damper 22 reduces vibrations in the arm 14 during launch of the rocket. It is noted that the rocket structure 10 is merely shown as one possible implementation of the damper 22 in that the damper 22 will have many other applications. It is also noted that the damper 22 can be located a various locations, can be of various sizes, and can be one of a number of the dampers 22. It is further noted that in other designs, the particle damper may not be a separate structure from the structure being damped, but may be the structure being damped itself that is filled with damping particles, as discussed below.

Figure 2:
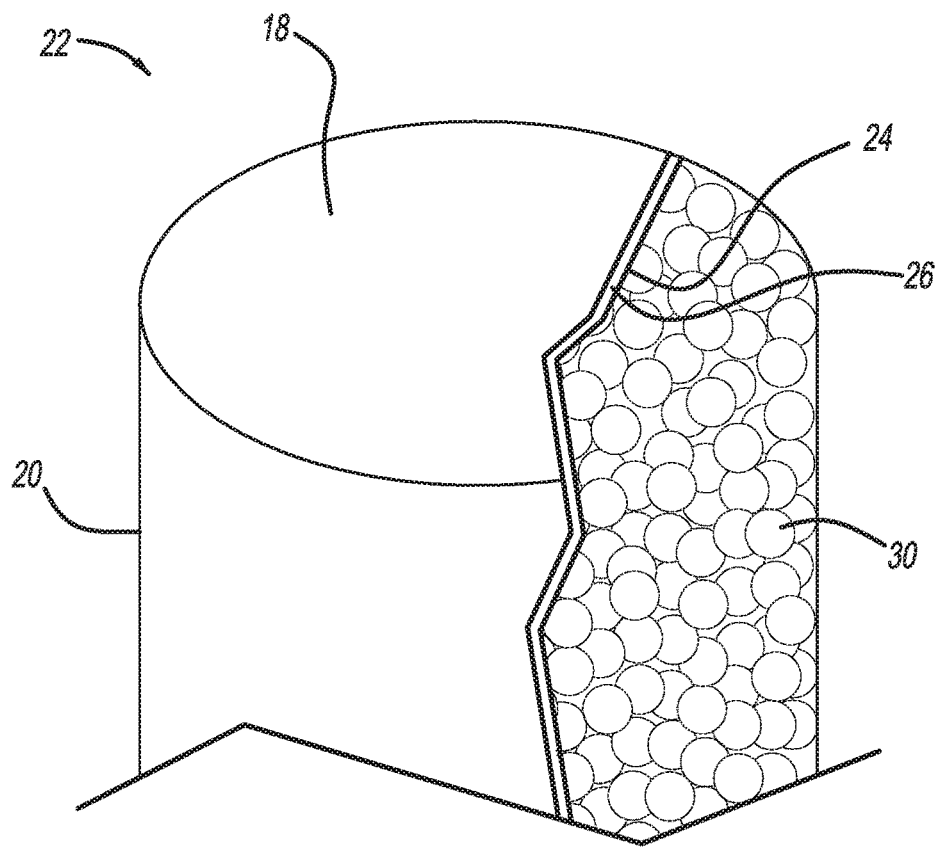
FIG. 2 is a broken-away isometric view of the particle impact damper separated from the rocket structure and showing spherical particles therein.

FIG. 2 is a broken away isometric view of the particle impact damper 22 removed from the structure 10. The particle impact damper 22 includes a hollow cylindrical metal body 20 that is made of a high strength, corrosion resistant alloy, for example, stainless steel or a titanium alloy, defining a cavity 24 therein. It is noted that although the damper 22 has a cylindrical shape in this design, that is merely for illustration purposes only in that the body 20 of the damper 22 may have other shapes, such as a rectangular shape. An internal surface 26 of the body 20 can be coated with a material having a high coefficient of friction with low yield strength, either a metallic or polymeric material. A metal coating is preferred if the body sealing process requires a high temperature, such as welding or soldering. Suitable metal coatings include aluminum, copper and silver, which provide a high frictional surface with low yield strength of the internal surface 26 of the body 20.

Figure 3:
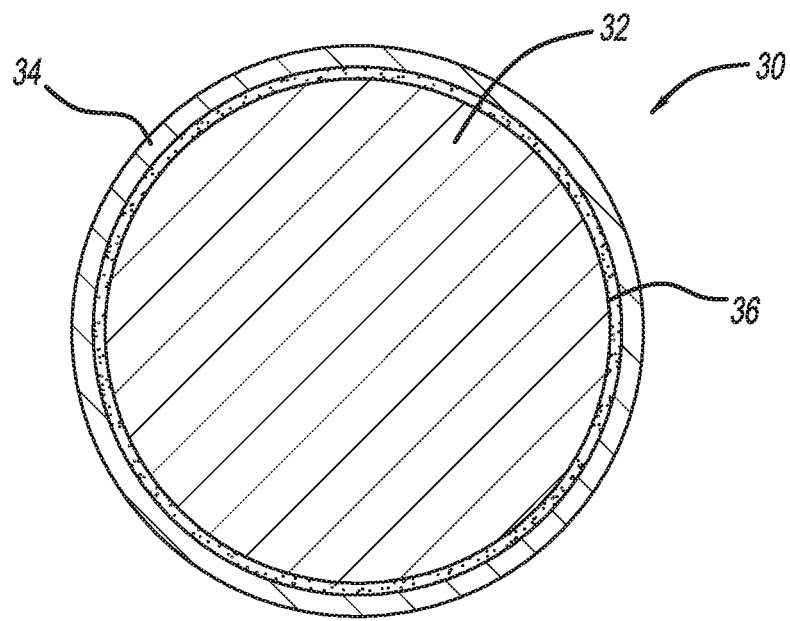
FIG. 3 is a cross-sectional view of one of the spherical particles shown in FIG. 2.

The cavity 24 is filled with a number of spherical particles 30 that provide the damping. FIG. 3 is a cross-sectional view of one of the spherical particles 30, where each particle 30 includes an inner core 32 and an outer coating 34. The core 32 is made of a high density and high modulus metal alloy, such as tungsten, rhenium, or an alloy thereof, and the coating is made of a high coefficient of friction metal with low yield strength, such as vacuum-deposited aluminum. A bonding layer 36, such as a titanium bonding layer, may be required before applying the aluminum coating 34 to enhance the adhesion of the aluminum coating 34 to the tungsten or the tungsten rhenium core 32. In an alternate embodiment, non-metallic spherical particles may also be employed in the damper 22. For example, the core 32 can be made of a high density and high modulus non-metallic material, such as tungsten carbide, and the coating 34 may be a non-metallic, high frictional coating, such as certain polymeric materials deposited on the core 32 using vacuum deposition.

The thickness of the coating 34 would depend on the material and the specific application. For example, if the damper 22 is being used in the rocket structure 10 as discussed above, the coating 34 may be very thin because the damping is only required for a very short time during launch. However, if the damper 22 is being used over an extended period of time where the coating 34 may wear off of the particle 30 under continued use, it may be desirable to have a thicker coating. In other words, the thickness of the coating 34 on the spherical particles 30 is not critical for space applications since a typical duration for damping is less than one minute during launch. However, a thicker coating may be required for dampers that are installed in a constant vibratory environment, such as aircraft, automobiles, etc.

Figure 4:
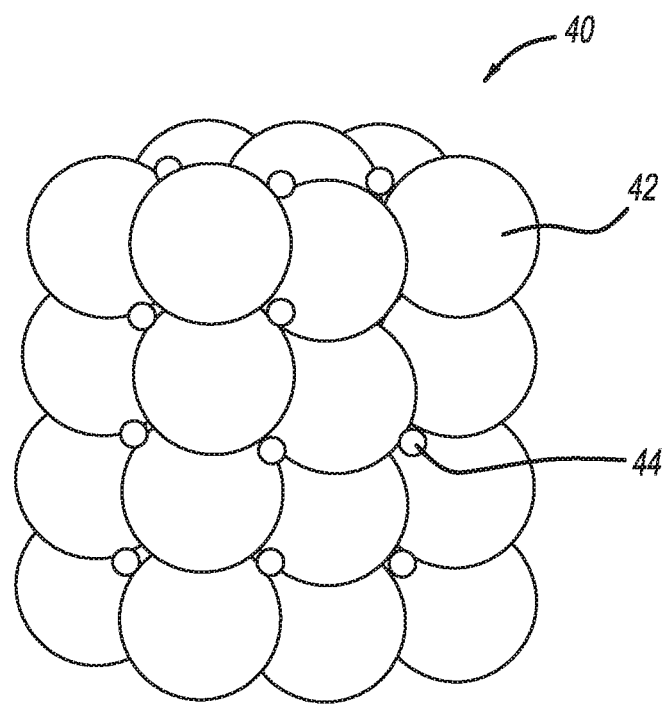
FIG. 4 is an isometric view of a configuration of the spherical particles provided within the impact damper shown in FIG. 2.

FIG. 4 is an isometric view showing an array 40 of the particles 30 separated from the body 20, but in the shape of the cavity 24, to show how the particles 30 can be packed in the body 20. In order to provide the desired fill of the cavity 24 for peak damping performance, the spherical particles 30 are provided in two sets having different diameters including a first set of spherical particles 42 having a diameter selected to be approximately 1/10 of the smallest dimension (diameter) of the cavity 24, and a second set of spherical particles 44 having a diameter selected to be approximately 1/10 of the diameter of the first set of the spherical particles 42.

During assembly of the damper 22, the body 20 and the coated spherical particles 30 are carefully cleaned using an organic solvent, such as an acetone, followed by isopropyl alcohol to remove residues of any processing or cleaning fluid that may act as a lubricant and compromise the high friction between the spherical particles 30 and the metal cavity wall. The first set of the large spherical particles 42 are packed into the cavity 24, and after mechanically shaking and settling, the spherical particles 42 form a randomly close packed network with many open octahedral voids between the spherical particles 42. The small spherical particles 44 are then filled in the cavity 24 to occupy these voids and provide a packing ratio of, for example, greater than 0.7. After weighing the total mass of the particle damper 22 to confirm that a high packing ratio has been achieved, a pre-cleaned metal lid 18 is placed on the body 20 to seal the closely packed spherical particles 30 therein. The sealing method can vary from purely mechanical, such as a threaded cap to a metallurgical in nature seal, such as soldering, brazing or welding.

The foregoing discussion describes exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A particle impact damper comprising an outer body defining an internal cavity and a plurality of spherical particles positioned within the cavity, said plurality of spherical particles each including an inner core made of a high density and high modulus material and a thin outer coating made of a high coefficient of friction and low yield strength material so as to provide high friction contact between the particles and between the particles and the outer body.

2. The damper according to claim 1 wherein the outer body is cylindrical.

3. The damper according to claim 1 wherein the outer body is a metal outer body.

4. The damper according to claim 3 wherein an inside surface of the outer body is coated with a high coefficient of friction and low yield strength material.

5. The damper according to claim 1 wherein the inner core is a metal.

6. The damper according to claim 5 wherein the inner core is tungsten, rhenium, or an alloy of tungsten or rhenium.

7. The damper according to claim 1 wherein the inner core is a non-metal.

8. The damper according to claim 7 wherein the inner core is tungsten carbide.

9. The damper according to claim 1 wherein the outer coating is a metallic coating.

10. The damper according to claim 9 wherein the outer coating is aluminum.

11. The damper according to claim 1 wherein the outer coating is a non-metal.

12. The damper according to claim 11 wherein the outer coating is a polymer.

13. The damper according to claim 1 wherein the plurality of spherical particles have different diameters.

14. The damper according to claim 13 wherein the plurality of spherical particles include a first set of spherical particles having a first diameter and a second set of spherical particles having a second smaller diameter, where the first diameter is greater than the second diameter.

15. The damper according to claim 14 wherein the first set of spherical particles has a diameter that is $1/10^{th}$ of a smallest dimension of the cavity and the second set of spherical particles have a diameter of about 1/10$^{th}$ of the diameter of the first set of spherical particles.

16. The damper according to claim 1 wherein the cavity has a fill ratio greater than 0.7 of the plurality of spherical particles.

17. The damper according to claim 1 further comprising a bonding layer provided between the inner core and the outer coating for bonding the coating to the core.

18. The damper according to claim 1 wherein the damper is on a spacecraft structure.

19. A particle impact damper comprising an outer body defining an internal cavity and a plurality of spherical particles positioned within the cavity, said plurality of spherical particles each including an inner core made of a high density and high modulus metal and a thin outer coating made of a high coefficient of friction and low yield strength metal, wherein the outer body is a metal body having an inside surface coated with a high coefficient of friction material.

20. A particle impact damper comprising an outer body defining an internal cavity and a plurality of spherical particles positioned within the cavity, said plurality of spherical particles each including an inner core made of a high density and high modulus non-metal and a thin outer coating made of a high coefficient of friction and low yield strength non-metal, wherein the outer body is a metal body having an inside surface coated with a high coefficient of friction material so as to provide high friction contact between the particles and between the particles and the outer body.

* * * * *